US008316074B2

(12) United States Patent
McManis

(10) Patent No.: US 8,316,074 B2
(45) Date of Patent: Nov. 20, 2012

(54) NETWORK-ACCESSIBLE MEMORY

(75) Inventor: Charles E. McManis, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1731 days.

(21) Appl. No.: 11/078,279

(22) Filed: Mar. 11, 2005

(65) Prior Publication Data

US 2006/0218362 A1 Sep. 28, 2006

(51) Int. Cl.
*G06F 15/16* (2006.01)
(52) U.S. Cl. ...................................................... 709/200
(58) Field of Classification Search .................. 709/200
See application file for complete search history.

(56) References Cited

U.S. PATENT DOCUMENTS

| | | | | |
|---|---|---|---|---|
| 6,459,700 | B1 * | 10/2002 | Hoang | 370/401 |
| 6,738,821 | B1 * | 5/2004 | Wilson et al. | 709/230 |
| 2001/0016920 | A1 * | 8/2001 | Chan | 714/11 |
| 2001/0047460 | A1 * | 11/2001 | Kobayashi et al. | 711/162 |
| 2002/0010812 | A1 * | 1/2002 | Hoese et al. | 710/11 |
| 2002/0013832 | A1 * | 1/2002 | Hubbard | 709/220 |
| 2003/0033520 | A1 * | 2/2003 | Peiffer et al. | 713/153 |
| 2003/0074528 | A1 * | 4/2003 | Soejima et al. | 711/114 |
| 2003/0204683 | A1 * | 10/2003 | Okumoto et al. | 711/147 |
| 2004/0064660 | A1 * | 4/2004 | Lyons | 711/167 |
| 2005/0188246 | A1 * | 8/2005 | Emberty et al. | 714/5 |
| 2006/0010154 | A1 * | 1/2006 | Prahlad et al. | 707/102 |
| 2006/0218362 | A1 * | 9/2006 | McManis | 711/162 |

OTHER PUBLICATIONS

Elliot Borin, "New Memory That Doesn't Forget," Wired News, pp. 1-4, Jul. 9, 2003, downloaded from http://www.wired.com/news/technology/0,1282,59559,00.html on Nov. 29, 2004.
"Xilinx Spartan-3 Platform FPGAs Frequently Asked Questions," pp. 1-4.

* cited by examiner

*Primary Examiner* — William Goodchild
(74) *Attorney, Agent, or Firm* — Blakely, Sokoloff, Taylor & Zafman LLP

(57) ABSTRACT

A network-accessible memory (NAM) element comprises a substrate, a memory mounted to the substrate, network interface circuitry and logic circuitry. The network interface circuitry implements a network physical layer and is mounted to the substrate. The logic circuitry is mounted to the substrate and is coupled to the network interface circuitry and the memory, and is configured to operate as a memory controller to control access to the memory by a host processor which is external to the NAM element through the network interface circuitry. The NAM element can be interconnected with other NAM elements to form a larger NAM storage device.

33 Claims, 8 Drawing Sheets

NETWORK-ACCESSIBLE MEMORY

FIELD OF THE INVENTION

At least one embodiment of the present invention pertains to network storage, and more particularly, to a network-accessible memory device.

BACKGROUND

Various forms of network based storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system typically includes at least one storage server, which is a processing system configured to store and retrieve data on behalf of one or more client processing systems ("clients"). In the context of NAS, a storage server may be a file server, sometimes referred to as a "filer". A filer operates on behalf of one or more clients to store and manage shared files in a set of mass storage devices, such as magnetic or optical disks or tapes. The mass storage devices may be organized into one or more volumes of a Redundant Array of Inexpensive Disks (RAID). Enterprise-level filers are made by Network Appliance, Inc. of Sunnyvale, Calif.

In a SAN context, the storage server provides clients with block-level access to stored data, rather than file-level access. Some storage servers are capable of providing clients with both file-level access and block-level access, such as certain filers made by Network Appliance, Inc.

A problem that is associated with many network based storage systems is latency, and more specifically, the latency associated with accessing the storage server's mass storage devices ("access latency"). From the perspective of a user, there is often a noticeable delay when a storage client accesses the mass storage devices through the storage server (this problem may be more evident during read operations, since in many systems, the storage server can acknowledge a write before the data has actually been written to mass storage, if it has a non-volatile buffer memory). The delay is caused primarily by the access latency of the mass storage devices and is inconvenient and often annoying to the user. It is desirable, therefore, to reduce this delay.

Caching is a well-known technique for reducing access latency in general. A cache is a storage device which is normally much faster than the primary storage facility that it supports, although it is also usually much smaller in capacity. Cache memory is commonly employed on a computer motherboard, for example, between a microprocessor and its main memory, to reduce the time required for the microprocessor to access commonly-accessed data. There are often multiple levels of cache memory employed within a computer, i.e., a level 1 (L1) cache, a level 2 (L2) cache, and so forth, where each level of cache is larger and slower than the lower cache level(s). These cache memories are typically very small in capacity compared to main memory (typically several orders of magnitude smaller).

Caching can also be used in a network context, to store larger amounts of data. For example, to reduce latency associated with a accessing content over the Internet (i.e., Web pages, multimedia, etc.), a caching appliance may be employed somewhere in the path between a content server and its client(s), to cache commonly accessed content. An example of such an appliance is the NetCache, made by Network Appliance, Inc.

A network storage server, such as a filer, generally includes internal cache memory to speed up microprocessor operations, but what is needed is an effective and cost-efficient way to reduce access latency associated with a large array of (typically external) mass storage devices of a storage server. A storage server may support many terabytes of storage and hundreds of clients at a time. Consequently, to be useful in this context a cache must be able to store large amounts of data, but must not be too expensive. The L1 and L2 (etc.) caches typically employed inside a storage server (i.e., on the motherboard) are much too small in aggregate to be useful for this purpose. A storage server can use its main memory to cache relatively small amounts of data for purposes of servicing client requests, but even main memory is too small to be highly effective as a cache for servicing client requests. On the other hand, a separate, external caching appliance, such as a NetCache, might have adequate storage capacity for this type of caching, but it would be too expensive and too slow to be practical for this purpose. What is needed, therefore, is an effective and cost-efficient way to provide caching for a network storage server, for purposes of servicing client requests.

Another problem associated with many processing systems, including large-capacity network based storage systems, is limited memory addressability. Modern programmable microprocessors have limited memory address space. In some cases, a processor's total address space may be limited by the chipset on which it is implemented, so that the actual usable (effective) address space of the processor is smaller than its design maximum address space. This restriction can prove problematic in a very large-capacity storage server system. Furthermore, conventional expansion buses, such as peripheral component interconnect (PCI), provide only limited capability for memory expansion.

Another problem associated with some large-capacity network storage systems relates to the sharing of state between failover partners in a cluster-failover storage system. Cluster-failover is a well-known technique by which multiple storage servers can be used to provide redundancy for each other. In one known prior art cluster-failover configuration, two or more file servers operating as failover partners each locally maintain a separate log, in non-volatile RAM (NVRAM), of all writes requested by clients since the last "consistency point" (a consistency point is the event of committing a set of recently received writes to disk). This non-volatile log, or "NVLog", is used only in the event of a power loss or other similar failure, to reconstruct the state of the system since the last consistency point.

When one of the file servers receives a write transaction from a client, it updates its local NVLog and also sends a transaction message to its cluster partner to allow the cluster partner to update its NVLog. This sharing of state (i.e., NVLog) by the cluster partners problematic, because each storage server must have a priori knowledge of the identity of its failover partner. In addition, the write transaction cannot be acknowledged to the client until both cluster partners have recorded the transaction in their respective NVLogs. Consequently, the entire write transaction from start to finish can be undesirably slow from the user's perspective.

Yet another problem associated with some network storage systems relates to the acquisition of snapshots. A snapshot is a record of the exact state of a set of data (e.g., an entire volume or a directory within a volume) stored in a storage system at a particular instant in time. Snapshots may be used, for example, for backup purposes to recover the state of the system a particular time or to identify the source of data corruption.

Snapshotting can be used, for example, in a system which includes multiple file servers, each of which implements a portion of a file system. In such a system, when a snapshot of the entire file system is requested, each of the file servers takes a snapshot of its portion of the file system. One problem with such a system is that the snapshot request may be received at slightly different times at each of the file servers, due to differing and unpredictable communication distances and delays between the file servers. Yet it is critical that each file server take its snapshot at the same instant in time, to maintain data consistency.

What is needed, therefore, is a way to overcome these problems.

SUMMARY OF THE INVENTION

The present invention includes a network-accessible memory (NAM) element that comprises a substrate, memory mounted to the substrate, network interface circuitry mounted to the substrate to implement a network physical layer, and logic circuitry mounted to the substrate. The logic circuitry is coupled to the network interface circuitry and the memory, and is to control access to the memory by a host processor which is external to the NAM element through the network interface circuitry.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A network-accessible memory (NAM) and applications for a NAM are described below. The inventor of the present invention has recognized (among other things) that rapidly falling prices in three key technology areas can be taken advantage of, by combining these technologies to form a new, very low-cost approach to network storage; these three technologies are random access memory (RAM), field programmable gates arrays (FPGAs), and Ethernet physical layer ("PHY") circuitry. As further described below, a NAM element or a NAM based system is an effective and inexpensive solution for a variety of storage applications, some examples of which include SAN acceleration, a large (but inexpensive) cache for a storage server, variable-performance storage arrays, and improved sharing of state between failover partners in a cluster-failover configuration.

As described further below, a NAM element may comprise a substrate, such as a circuit board, as well as RAM, network interface circuitry, and logic circuitry, all mounted to the substrate. The logic circuitry, which may be an FPGA, operates as a memory controller to control access to the RAM by a host processor which is external to the NAM module (such as the processor(s) of a storage server) via the network interface circuitry. The RAM may be a form of dynamic RAM (DRAM), such as synchronous DRAM (SDRAM). The network interface circuitry may consist merely of Ethernet (e.g., 10/100/1000BaseT) PHY circuitry, which can be coupled directly to a network medium.

A NAM element can be implemented as a block based device that implements a very simple block protocol over Ethernet, for example. Such a protocol, an example of which is described below, may implement the bare minimum to read, write, and manage the state of blocks that are being stored, rather than implementing a full "disk"-like interface. The Ethernet protocol described below is a valid IEEE 802.3 protocol but is not IP based. Instead, it is a bare protocol designed for a network element that operates entirely on a private fabric.

Two or more NAM elements may be integrated within a housing, or "shelf", to form a large-capacity NAM module suitable for storing large amounts of data. Such a NAM module is suitable for use as a cache for a storage server and other storage applications. The NAM module may include a network (e.g., Ethernet) connection, a passive backplane, network (e.g., Ethernet) switching circuitry coupled between the passive backplane and the network connection, and multiple NAM modules coupled to the passive backplane, all within a housing. Each of the NAM modules may be constructed as described above and as further described below.

NAM Element

Figure 1:
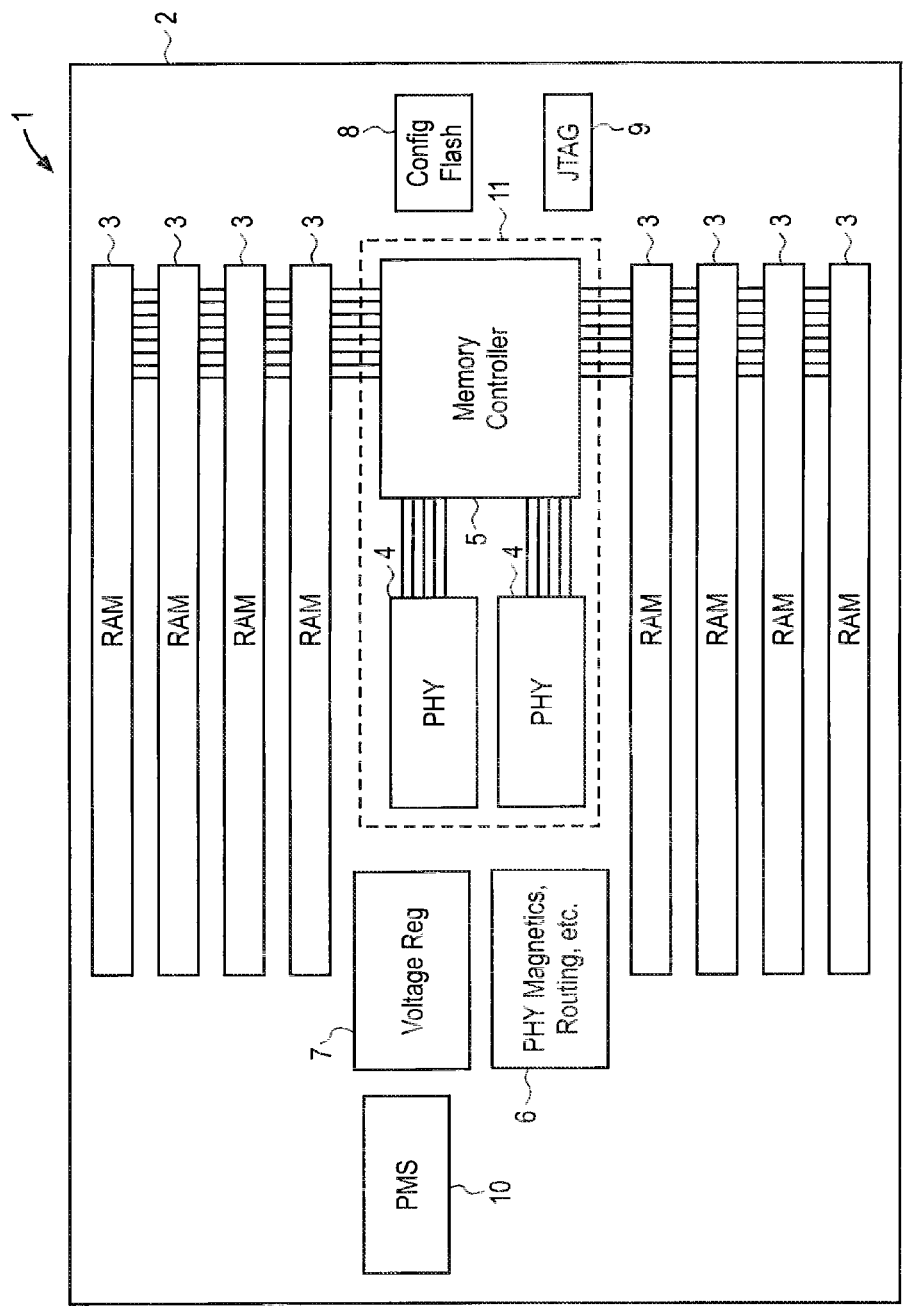
FIG. 1 is a block diagram of a single NAM element, according to an embodiment of the invention.

Refer now to FIG. 1, which is a block diagram of a single NAM element, according to an embodiment of the invention. The illustrated NAM element 1 includes a substrate 2, which may be, for example, a standard printed circuit board substrate. Mounted on the substrate 2 are a number of memory modules 3, one or more network PHY circuits 4, and logic circuitry which implements a memory controller 5 and is coupled between the network PHY circuits 4 and the memory modules 3. Each of the memory modules 3 may be, for example, an SDRAM DCC Dual In-Line Memory Module (DIMM). In one embodiment, the memory modules 3 are fully-buffered DIMMs (i.e., serially connected to each other and to the memory controller 5).

The network PHY circuits 4 may be, for example, Ethernet PHY chips. In the illustrated example, two independent Ethernet PHY chips 4 are provided, such that the NAM element 1 is dual-ported; however, the NAM element 1 could alternatively have essentially any other number of PHY circuits 4. Note that the network PHY circuits 4 do not include an Ethernet media access controller (MAC); instead, a MAC is implemented within the memory controller 5 (one MAC for each PHY circuit 4). Similarly, the number of memory modules 3 on the NAM element 1 can also be varied. Further, in other embodiments, each of the Ethernet PHY circuits 4 could be replaced by, for example, a simple serializer/deserializer (SERDS).

The memory controller 5 controls access to the memory modules 3 by a host processor (not shown) which is external to the NAM element 1 (such as the processor(s) of an external storage server) through the PHY circuits 4. The memory controller 5 may be implemented in the form of an appropriately-programmed FPGA. In alternative embodiments, the memory controller 5 may be implemented as an application-specific integrated circuit (ASIC), programmable logic array (PLA), microprocessor, microcontroller, or the like.

Note that the memory in the NAM element 1 has its own memory address space, which is maintained by the memory controller 5, and is not within the effective memory address space of any external host. Modern processors have limited memory address spaces. In some cases, a processors' total address space may be limited by the address space of the chipset, so that the usable address space of the processor is less than the theoretical maximum address space of the processor.

In the illustrated embodiment, the NAM element 1 also includes other elements, such as appropriate, conventional PHY magnetics, routing, and connectors 6, as well as conventional voltage regulator components 7 for the memory controller and memory modules 3, configuration flash memory 8, and a JPEG port 9. The details of these other elements are not germane to the present invention and are well understood by those of ordinary skill in the art.

Memory on the NAM element 1 is only active when a command (e.g., read or write) is being processed. In certain embodiments of the invention, the NAM element 1 provides memory persistence by use of battery power to back up the main power supply. In the event of a main power supply failure, the memory modules 3 are placed into self-refresh mode (assuming they are self-refreshing DRAM) by the memory controller 5. To support this capability, the NAM element 1 includes power monitor and selector (PMS) circuitry 10. The PMS circuitry 10 normally routes power from the external main power supply (not shown) to the memory modules 3 and other components of the NAM element 1, but will cause power to instead be provided from an external backup battery (not shown) if the voltage level of the main power supply falls below a predetermined minimum level. The details of circuitry which can perform this function are well within the knowledge of those of ordinary skill in the art and need to be provided herein.

In at least one embodiment of the invention, the memory controller 5 is an approximately 1000K-gate FPGA that implements two SDRAM or DDR memory controllers, two Ethernet MACs, a small state execution engine, and the necessary buffering for a small queue of 1500 byte Ethernet packets and memory transactions. The FPGA has sufficient internal RAM to provide this buffering without an external RAM chip.

The state execution engine implemented by the memory controller 5 is designed to implement a very simple protocol. In at least one embodiment this protocol is encoded in standard 1500 byte Ethernet packets. At least the following commands are implemented by the protocol:

| Command | Description |
| --- | --- |
| INIT | Initialize the element if not already initialized |
| READ BLOCK, <nn>, <stat> | Read a 1 K Block of memory from bucket <nn> |
| WRITE BLOCK, <nn>, <dd>, <stat> | Write data <dd> to memory in bucket <nn>, set its status to <stat> |
| GET STAT BLOCK, <nn> | Return the status of block <nn> (dirty/valid/zero) |

-continued

| Command | Description |
| --- | --- |
| SET STAT BLOCK, <nn> | Set the status of block <nn> (dirty/valid/zero) |
| CONFIG | Return element configuration/status (counters, size, etc) |

Ethernet cyclic redundancy checking (CRC) should guarantee local packet integrity, however there is space in a packet for 1 Kbyte of data and a fairly good forward error correction payload to not only protect against corruption, but also to correct it without a retransmission.

All packets received by the state machine cause a response packet to be generated. If a command results in the return of data in the response, and if there is an error in the data, the packet payload includes status bits describing the error.

Large-Capacity NAM Module

Figure 2A:
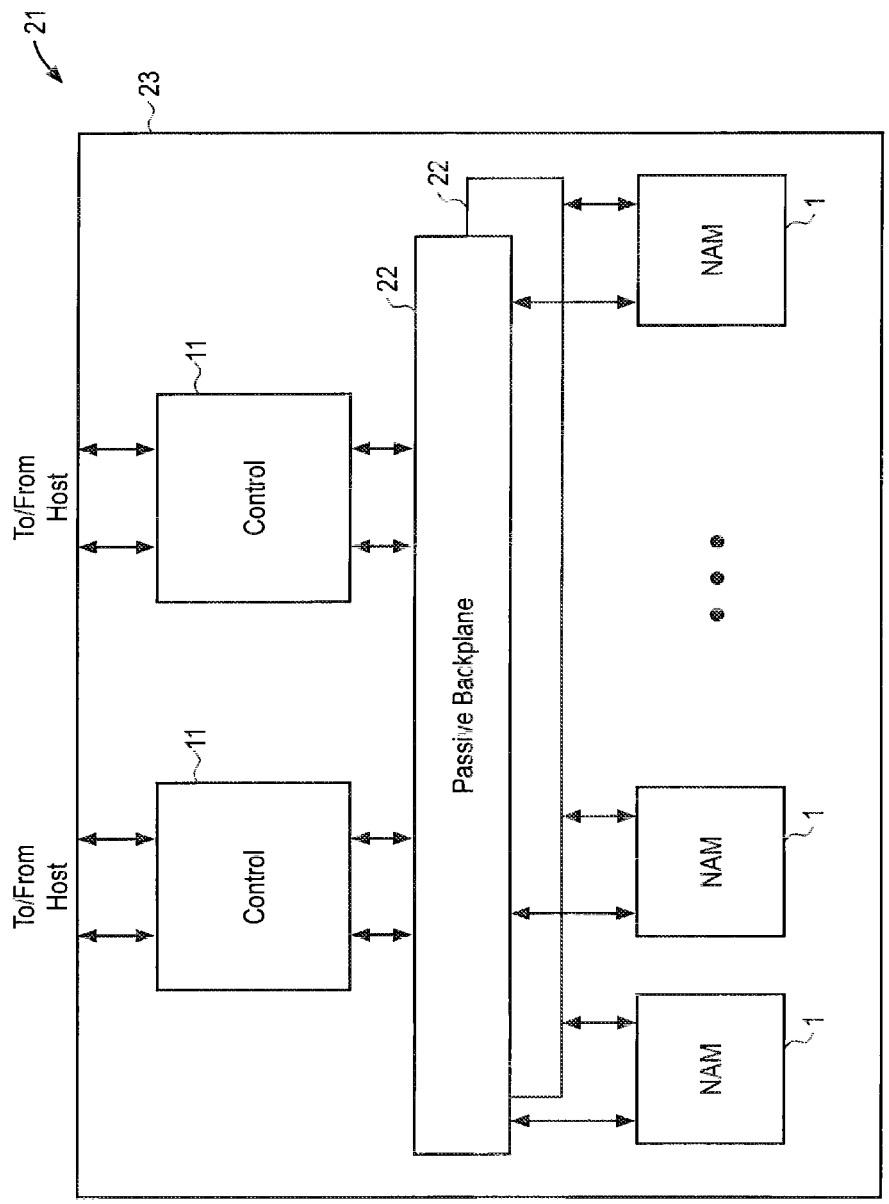
FIG. 2A is a block diagram of an example of a large-capacity NAM module according to an embodiment of the invention.

Multiple NAM elements 1 such as described above can be combined to form a large-capacity NAM module. FIG. 2A shows a block diagram of an embodiment of a large-capacity NAM module 21. As shown, multiple NAM elements 1 such as described above are connected respectively via a number of Ethernet passive backplanes 22 to a pair of redundant controllers 11 within a housing 23. The housing 23 may be, for example, a conventional rack-mount disk drive shelf, such as the DS14 shelf from Network Appliance, Inc., in which case each NAM element 1 may be implemented within a separate disk drive carrier designed to plug into the shelf (or other similar housing). Hence, the entire large-capacity NAM module 21 may appear physically (externally) very similar to a JBOD (Just a Bunch of Disks) disk shelf of the type used in many file server systems. In the embodiment of FIG. 2A, each of the NAM elements 1 has two ports, each of which is connected to a separate one of two passive backplanes 22 within the NAM module 21.

Also connected to the passive backplanes 22 are a pair of redundant controllers 11, each of which includes a memory controller 5 and a set of PHY circuits 4 such as shown in FIG. 1. In the embodiment of FIG. 2A, the controllers 11 are connected directly to the backplanes 22 and can communicate with the NAM elements 1 using any convenient protocol, which can be a private protocol.

Figure 2B:
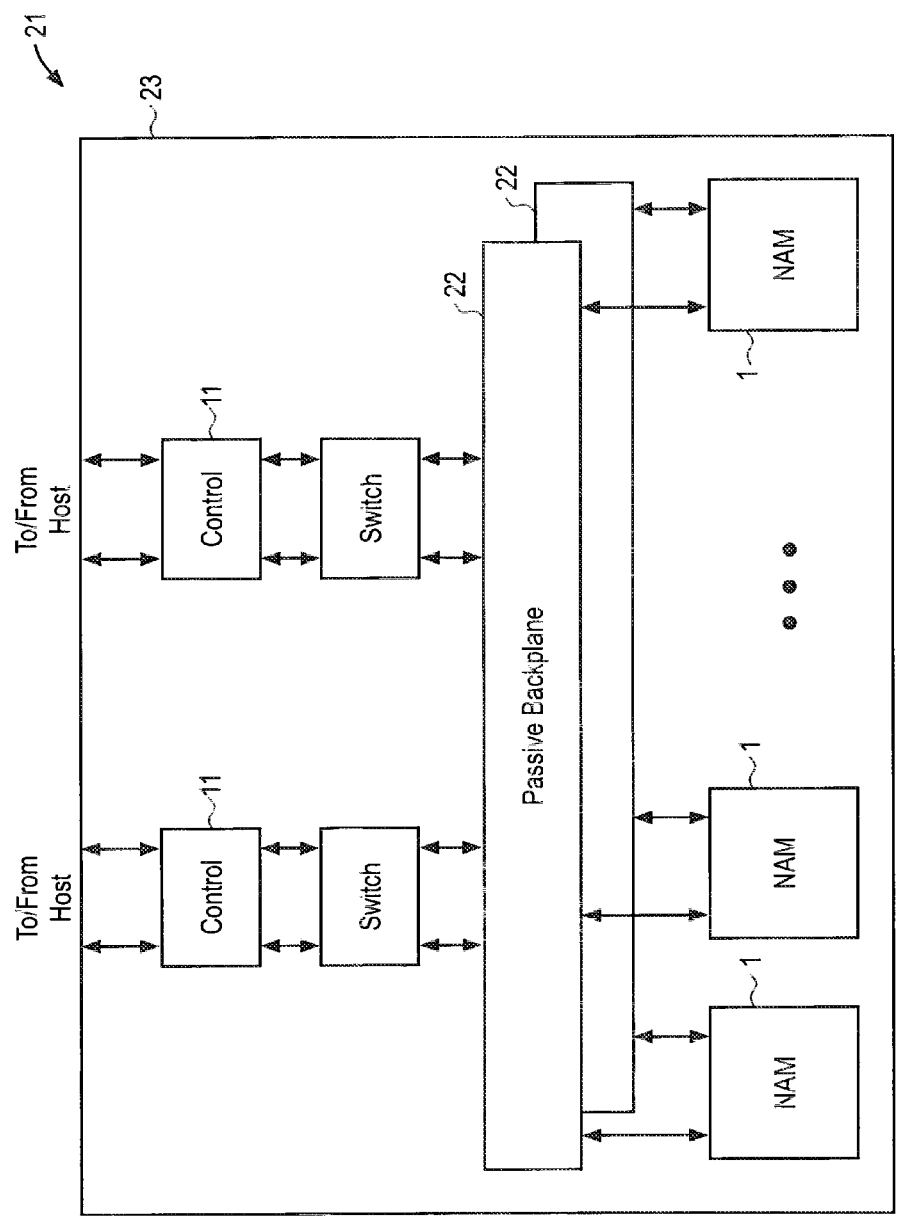
FIG. 2B is a block diagram of an example of a large-capacity NAM module according to an alternative embodiment of the invention.

In an alternative embodiment, shown in FIG. 2B, each of the controllers 11 is connected to the backplanes 22 through a separate Ethernet switch 24. In such an embodiment, communication between the controllers 11 and the NAM elements 1 is via Ethernet protocol. Each of the Ethernet switches 24 can be implemented on a separate, single chip which may have, for example, 24 100BaseT ports connected to the corresponding backplane 22 and two 1000BaseT (Gigabit) uplink ports connected to the corresponding controller 11. Two such chips combined with a small number of (e.g., six) octal PHY chips in the controller 11 implementing GbE provides ample network connectivity for many network storage applications.

The most cost-effective chips for PHYs are currently 100BaseT chips. Twenty NAM elements 1 generating traffic at wire speed for a 100BaseT connection can saturate two Gigabit Ethernet (GbE) uplink ports. Therefore, even using the least expensive technology (100BaseT), it is possible to achieve enterprise-level speeds by aggregating NAM elements 1 in this way.

Data corruption can occur within a NAM element 1, and a NAM element 1 may occasionally fail, as current RAM technology occasionally does. Accordingly, in certain embodiments of the invention, each of the controllers 11 implements an error detection and protection protocol, such as RAID-4 or RAID-5, across all of the NAM elements 1 in the NAM module 21. If, for example, a large-capacity NAM module 21 includes 20 individual NAM elements 1, which are divided into four RAID groups of five NAM elements 1 each, then each group of NAM elements 1 can provide RAID-protected 4-Kbyte block storage pools.

Further, in an embodiment such as shown in FIG. 2B, the Ethernet switching chip 24 may provide enough available semiconductor space on which to implement spare NAM elements. These spare NAM elements could then be used as hot spares for reconstructing data on failed NAM elements 1, or as the stable storage on which block state is maintained.

Further, it is possible to use some aspects of the IEEE 802.3 definition to advantage. By creating an Ethernet multicast group that associates all of the NAM elements 1 in a RAID group, a storage server can send a single packet requesting a read to the large-capacity NAM module 21 and get all five components of that request returned in parallel.

Assuming for example that there are 20 NAM elements 1 in a NAM module 21, the total block storage afforded by such a configuration would be 4/5*total storage. For 20 NAM elements 1 of 4 Gbyte each (e.g., each NAM element 1 including eight 512-Mbyte DIMMs), the total storage in the NAM module 21 would equal 64 Gbytes; or, for 8-Gbyte NAM elements 1, the total storage would be 128 Gbytes.

Note that the above described NAM module 21 has no single points of failure and can provide enterprise-level uptime and reliability using very inexpensive components.

SAN Acceleration

There are many applications in which a NAM element or a large-capacity NAM module such as described above can be advantageous. One application for a large-capacity NAM module is as a large cache for use in SAN acceleration, i.e., as a "SAN accelerator". From the perspective of a storage system manufacturer, this application can be used to enhance SAN performance for customers who need it, without burdening NAS customers who do not.

Figure 3:
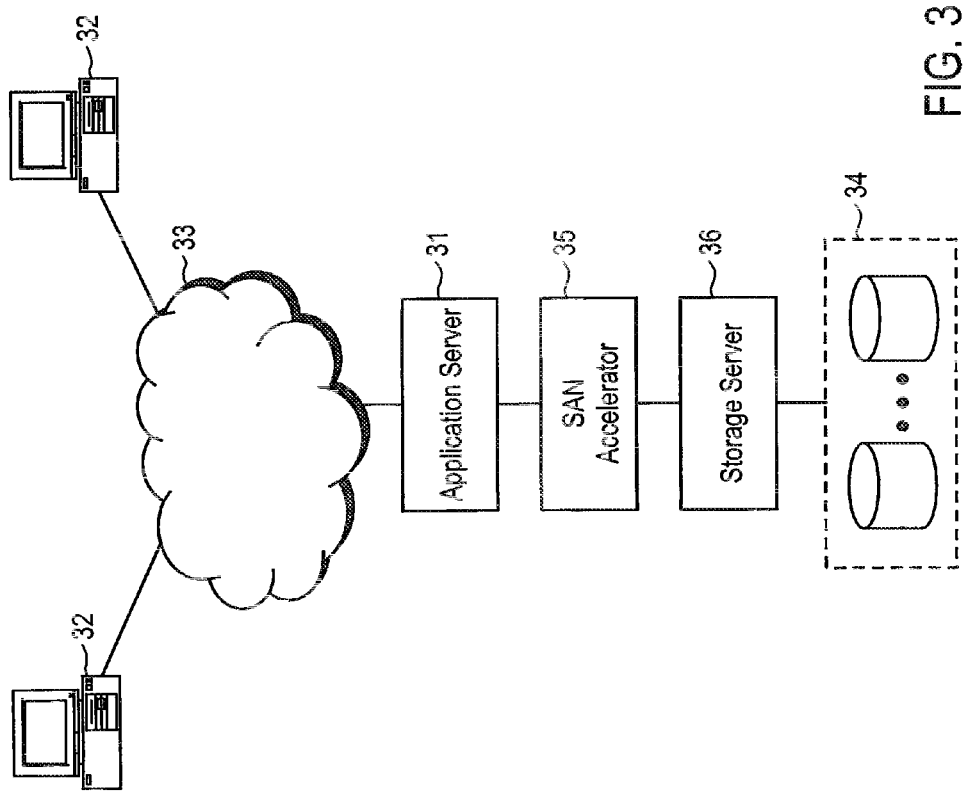
FIG. 3 shows a network environment in which a NAM system is used as a SAN accelerator.

This application is shown conceptually in FIG. 3. An application server 31 provides services to a number of clients 32 via a network 33. The network 33 may be, for example, a local area network (LAN), a wide area network (LAN), a corporate intranet, the Internet, or other type of network, or a combination thereof. The application server 31 is further connected through the SAN accelerator 35 to a storage server 36, via Fibre Channel, for example. The storage server 36 provides access to an array of storage devices 34, such as disks. An example of a suitable storage server is one of the Filer products of Network Appliance, Inc., configured to provide block-based access to stored data.

The SAN accelerator 35 can be the same as, or similar to, the NAM module of FIG. 2A or 2B. The SAN accelerator 35 can operate as a "bump in the fiber" between a SAN client (i.e., application server 31) and the storage server 33. The SAN accelerator 35 is dual-ported so that it can straddle a fault-tolerant fabric (e.g., Fibre Channel) infrastructure. The SAN accelerator 35 "exports" world-wide names (WWNs) and logical unit numbers (LUNs) from the storage server directly to the fabric on the client side. All accesses to the particular LUNs the storage server is exporting go through the SAN accelerator 35. In this configuration, the SAN accelerator 35 appears like a Fibre Channel switch to both the storage server 36 and the application server 31 (or another switch in a SAN infrastructure). Note that this configuration requires additional (and preferably redundant) intelligence on the SAN accelerator 35, i.e., a storage manager that provides Fibre Channel target and initiator functions.

In operation, Fibre Channel read requests from the application server 31 for the storage server LUNs arrive at the SAN accelerator 35, and the SAN accelerator 35 checks to see whether the requested block is in its internal NAM. If so, the block is returned from its NAM to the application server 31 with very low latency. If the block is not available, the request is forwarded by the SAN accelerator 35 to the storage server 36. Upon a successful response from the storage server 36, the block of data is both returned to the application server 31 and cached in the SAN accelerator's NAM using, for example, a least-recently used (LRU) cache replacement algorithm.

Fibre Channel write requests are stored in NAM in the SAN accelerator 35 and are immediately acknowledged by the SAN accelerator 35. Simultaneously, the write is queued to the storage server 36. As acknowledgements from the storage server 36 are received by the SAN accelerator 35, the block data are marked as "clean" in the NAM and become candidates for replacement.

This usage model is highly fault tolerant. In the event of NAM failure, a hot spare can be assimilated and the failed element reconstructed. As the NAM modules in the SAN accelerator are hot pluggable, an engineer can easily pull out the failed module element and replace it with a new one (which becomes a hot spare).

In the event of a failure of a storage manager (i.e., the intelligence within the SAN accelerator 35), any writes that had been queued by that storage manager would not be acknowledged, so a backup storage manager in the SAN accelerator 35 would re-queue them (causing, in the worst case, the same block to be written twice).

In the event of a failure of the storage server 36, the SAN accelerator 35 continues to acknowledge writes (and accept them) until the NAM has filled, and it continues to return data from the NAM while the data are valid. Requests that have to be serviced by the storage server 36 are postponed (queued). Once rebooted, the SAN accelerator's write queue continues draining, and reads can once again be serviced. At 100K operations per second (two 2 GB Fibre Channel ports doing full-wire 4 Kbyte writes), for example, a 128 Gbyte NAM-based SAN accelerator would be able to absorb slightly more than five minutes worth of writes from the application server 31 before pushing back to the application server 31. This would give the storage server 36 reasonable time to take over for a failed partner in a clustered failover (CFO) pair. At 200 MB/sec (one 2G Fibre Channel connection), the time until pushback would be over 10 minutes.

In the event of a total power failure, the SAN accelerator 35 retains blocks for as long as its battery or UPS can sustain its operation. On restart, the storage managers in the SAN accelerator 35 reboot and scan the NAM for "dirty" blocks (blocks that have been modified since they were cached) and reconstruct the write queue. In the event of the application server 31 failing, the SAN accelerator 35 continues to flush dirty blocks until the NAM is completely "clean." At that point the SAN accelerator 35 becomes idle and waits for the application server 31 to come back online.

Thus, a SAN accelerator such as described above provides a potentially transparent "upgrade" to a storage system that would allow a storage server to service an application with a high peak load. Further, the SAN accelerator would give the application server lower latency for those blocks that were most often read (since they would be in the NAM cache).

Variable-Performance Storage Arrays

Another advantageous application for a NAM system is in a variable-performance storage array. A NAM system can be used simply as high performance disks with very low latency (i.e., RAM disks). Normally RAM disks are of limited value, mainly because of the difficulty of choosing what data to store on this very limited resource. However, this difficulty can be overcome by using a storage server that includes a "write anywhere" file system, i.e., a file system which can select any available physical storage block to store any data or metadata. An example of such a storage server and its file system is any of various Filers made by Network Appliance, Inc., which include the Write Anywhere File Layout (WAFL) file system. The "write anywhere" aspect of such a file system can be exploited to make even small RAM disks useful, as described below.

Figure 4:
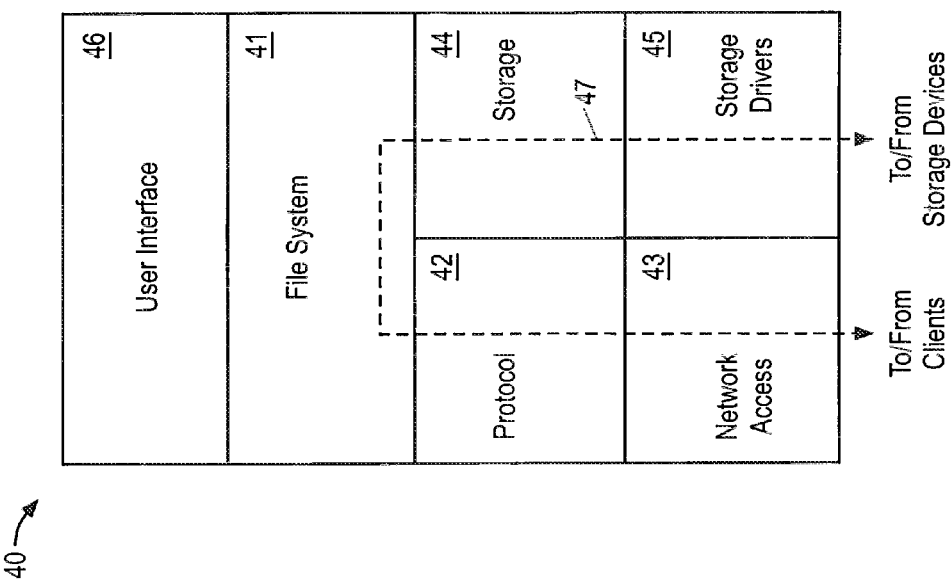
FIG. 4 is a block diagram of the operating system of a storage server.

Referring first to FIG. 4, an example of the operating system of such a storage server is shown in greater detail, according to at least one embodiment of the invention. The operating system 40 includes several modules, or "layers". These layers include a file system 41, which is software that keeps track of the directory structure (hierarchy) of the data stored in the storage media and manages read/write operations on the data (i.e., executes read/write operations on the disks in response to client requests). The file system 41 is a write anywhere file system, i.e., it can select any available physical storage block to store any data or metadata. Further, the file system 41 maintains semantic knowledge of the data or metadata it writes. Logically "under" the file system 41, on the network side the operating system 44 also includes a protocol layer 42 and an associated network access layer 43, to allow the storage server to communicate over a network with clients. The protocol 42 layer implements various higher-level network protocols, such as Network File System (NFS), Common Internet File System (CIFS), Hypertext Transfer Protocol (HTTP) and Transmission Control Protocol/Internet Protocol (TCP/IP). The network access layer 43 includes one or more drivers which implement one or more lower-level protocols to communicate over the network, such as Ethernet.

Also logically under the file system 41, on the storage side the operating system 44 includes a storage access layer 44 and an associated storage driver layer 45, to allow the file server 2 to communicate with the storage media. The storage access layer 44 implements a higher-level disk storage protocol, such as RAID, while the storage driver layer 45 implements a lower-level storage device access protocol, such as Fibre Channel Protocol (FCP) or SCSI. To facilitate description, it is henceforth assumed herein that the storage access layer 44 implements a RAID protocol, such as RAID-4, and therefore may alternatively be referred to as RAID layer 44.

Also shown in FIG. 4 is the path 47 of data flow, through the operating system 44, associated with a read or write operation.

Logically above the file system 41, the operating system 40 has a user interface (UI) layer 46, by which a user (e.g., a network administrator) can control and/or access functions of the storage server. The UI layer 46 may implement a command line interface, a graphical user interface (GUI), or both.

Figure 5:
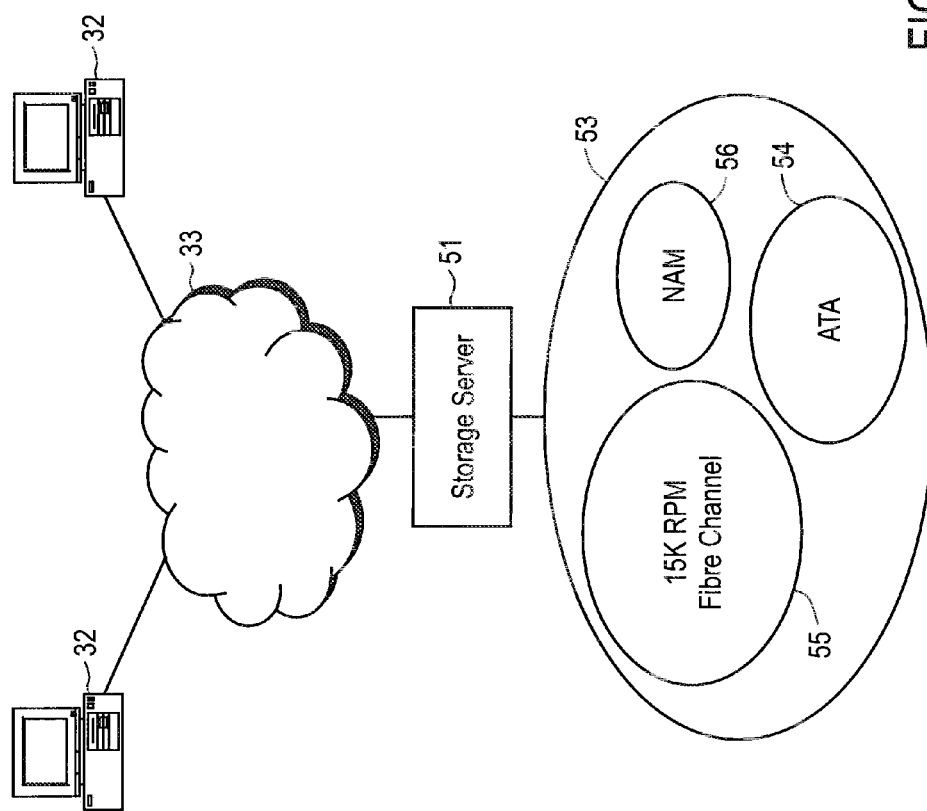
FIG. 5 conceptually shows a network environment in which NAM is used to provide variable-performance storage.

The vertical integration of the storage driver/RAID/Filesystem stack and the write anywhere nature of the file system 41 can be used to take advantage of NAM storage by allowing the "mixing and matching" of different storage technologies to get the optimum price/performance out of a storage array, tuned to a user's workload. Referring to FIG. 5, for example, consider a storage system, built around a storage server 51 that implements an operating system such as described above. The storage server 51 provides clients 32 with access an overall storage space 53 via a network 33. The overall storage space 53 is composed of RAID volumes from a number of different types of storage media, such as inexpensive ATA storage 54, (currently) expensive 15,000 RPM Fibre Channel disk storage 55, and inexpensive NAM storage 56. The storage server 51 does write allocation based on a free space map which it maintains, which covers all of the RAID volumes composing the storage space 53. The file system in the storage server 51 can be configured to compose the free space map to give priority to blocks based on NAM storage 56 over blocks based on Fibre Channel storage 55 or ATA storage 54, for example (i.e., more-frequently needed blocks are stored in NAM storage 56). Because the file system maintains semantic knowledge of the data or metadata it writes, it can choose to store particular types of data or metadata on one type of storage medium and other types of data or metadata on another type of storage medium. The file system may include a defragmenter, which can be enhanced to not only anneal files but to also age them and move them to (lower performance) ATA storage 54.

In this way, read performance can be enhanced by the cache within the storage server 51, and writes can be targeted to the most responsive storage. Modeling can be used to ascertain the various ratios of NAM storage 56 to Fibre Channel storage 55 to ATA storage 54 that yield the best balance of read and write performance. In an extreme case, the file system can move frequently read data to the NAM storage 56 as well creating a system where virtual volumes in the storage space get more responsive the more they are used, and then "sink" back into the inexpensive archival storage when they are left idle.

In this approach, NAM storage 56 is treated as just another shelf of disk drives, and failures within a NAM shelf can be treated/repaired just like failures in disk shelves are handled today. If one of the storage managers fail, it can be swapped out while the other storage manager maintains connectivity. Individual NAM modules can be swapped out just as disk drives can be swapped out today.

Note that in this application, it may be desirable to use appropriate backup techniques, such as battery backup, or emerging technology such as magneto-resistive memory which retain data without batteries. The defragmenter can also be enhanced to aggressively move blocks off of NAM storage 56 onto other storage, to reduce the time window in which a prolonged power outage might cause loss of data.

Thus, a write anywhere file system's ability to write any data or meta-data block into any available block can be leveraged to take advantage of a pool of storage 53 with non-uniform cost/performance tradeoffs. This approach allows the "mixing and matching" of different storage technologies to get the optimum price/performance out of a storage pool, tuned to the user's workload.

Victim Cache

Figure 6:
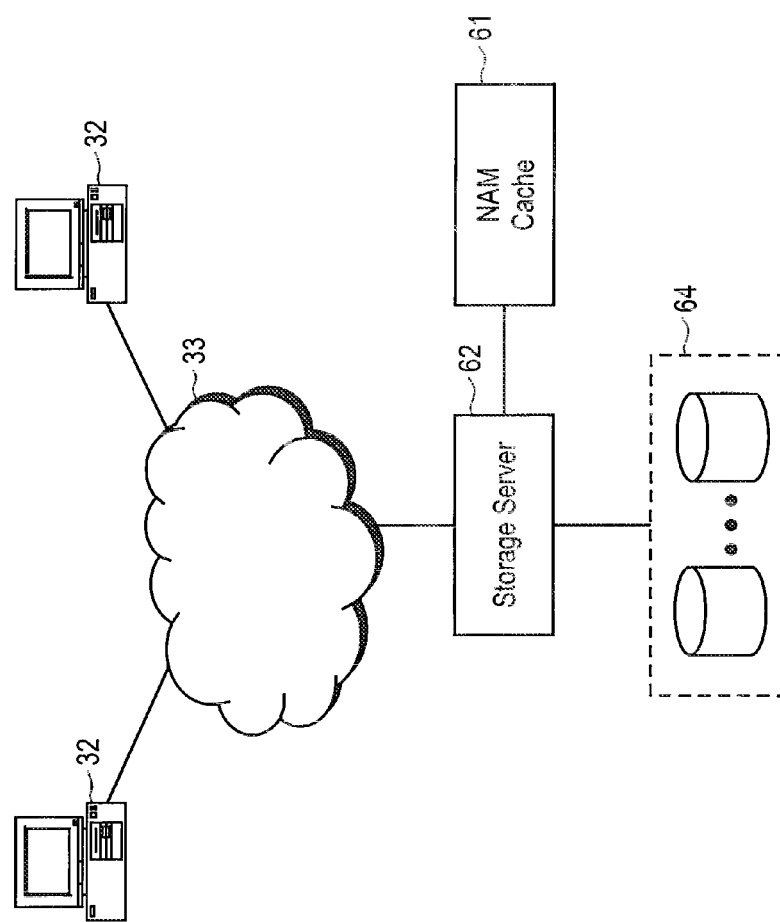
FIG. 6 is a block diagram which shows a network environment in which a NAM system is used as a large "victim cache" to support a storage server.

Yet another advantageous use of a NAM system is as a large "victim cache" for a storage server. An example of this approach is shown in FIG. 6. In this application, a NAM cache 61 is a large-capacity NAM module which can attach to an external port (e.g., GbE port) on a storage server 62. The NAM cache 61 can be the same as, or similar to, the NAM module of FIG. 2A or 2B. The storage server 62 selectively evicts data blocks ("victims") from its own internal cache to the NAM cache 61 and maintains a look-aside table that details where the blocks are stored in the NAM cache 61. When the storage server 62 receives a read request for a block, if the block is not in its own internal cache, the storage server 62 checks the NAM cache 61. If the block is in the NAM cache 61, it is fetched and returned to the requesting entity; otherwise, the block is read from the disk array 64.

In this approach, the NAM cache 61 is simply holding data that are already safely on disk. Therefore, no battery backup is required. The NAM cache 61 should guarantee data integrity, however, which it can do by providing RAID protection across individual NAM elements. If a NAM element fails, its data can be reconstructed from the other NAM elements. In the event of a double unit failure, all blocks in those NAM elements can be simply invalidated and the request treated as a cache miss.

Hence, the ability to keep more blocks available in low latency (NAM) storage helps to reduce read latency. Given that 128-256 GB or more of cache can easily be provided in as few as two DS-14 "shelves" of space, large read loads can be offloaded from a storage server. The NAM cache is a highly cost-effective option; since modified data are not stored in the cache, there is no requirement for battery backup or extraordinary protection measures.

Transaction NAM

Yet another use for a large-capacity NAM module such as described above is as a transaction memory. A transaction memory is a memory which can store and preserve a transaction, such as a read or write request, even if a power loss occurs before the transaction is acknowledged to the client. A NAM element or NAM module may be used as a transaction NAM if it is provided with a backup power source (such as battery backup), so that its included RAM effectively is non-volatile.

A transaction NAM may be used, for example, to improve state sharing between failover partners in a cluster-failover storage configuration, as will now be described. As noted above, in one known prior art cluster-failover configuration, two or more file servers (e.g., file servers) operating as failover partners each locally maintain a separate NVLog of all writes requested by clients since the last "consistency point". The NVLog is used only in the event of a power loss or other similar failure, to reconstruct the state of the system since the last consistency point. The NVRAM in which the NVLog a stored is an example of a transaction memory.

Figure 7:
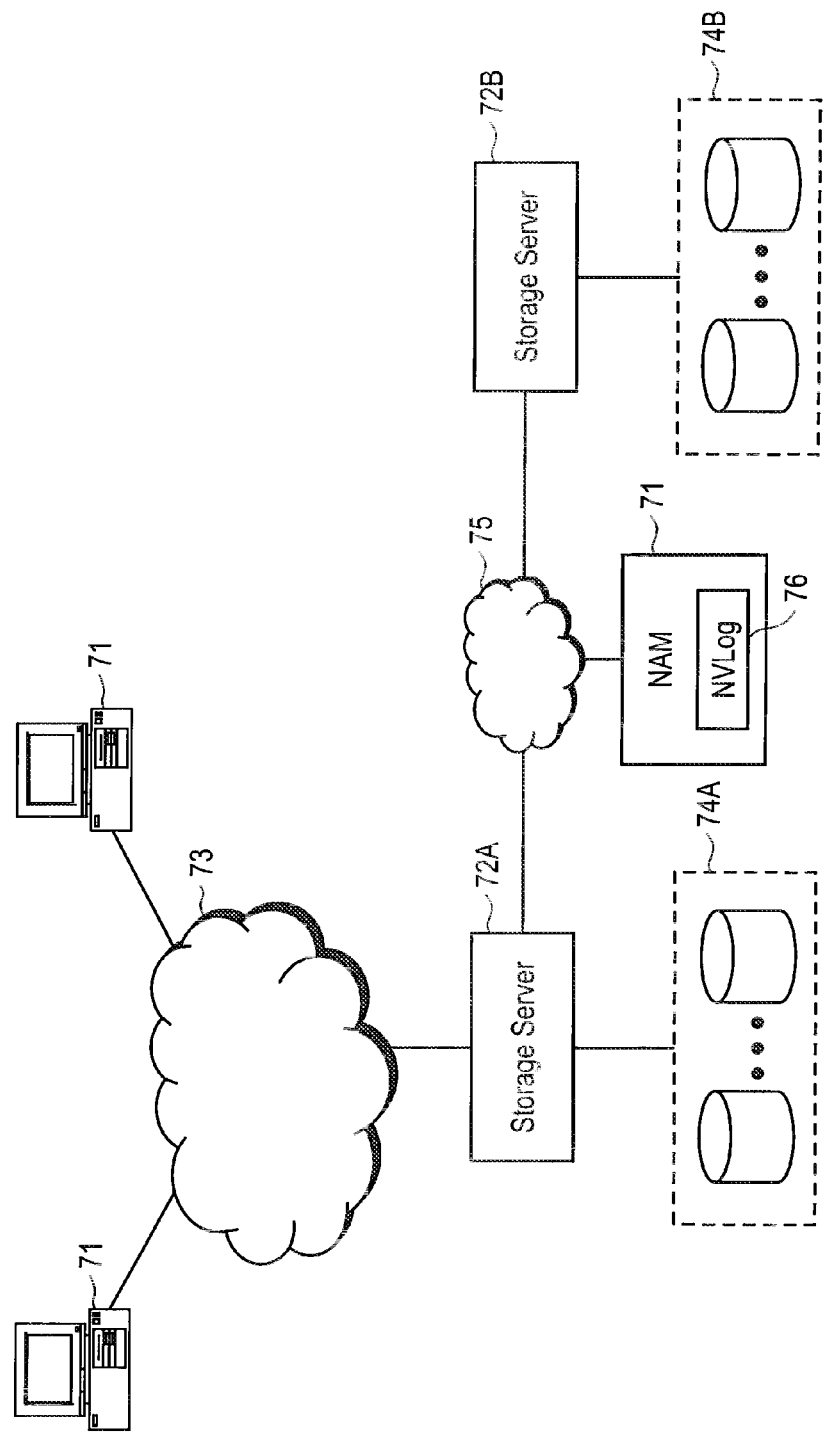
FIG. 7 illustrates a cluster-failover configuration of storage servers, which includes a centralized transaction NAM.

One problem with a traditional cluster-failover configuration is that each storage server must have a priori knowledge of the identity of its failover partner. Consequently, FIG. 7 shows how a large-capacity NAM module can be used to improve state sharing in a cluster-failover configuration. A storage server 72A in a cluster-failover pair is coupled locally to a storage subsystem 74A, which includes multiple mass storage devices, and to a set of clients 71 through a network 73, such as a local area network (LAN). The storage subsystem 74A is managed by the storage server 72A. The storage server 72A receives and responds to various read and write requests from the clients 71, directed to data stored in or to be stored in the storage subsystem 74A. The mass storage devices in the storage subsystem 74A may be, for example, conventional magnetic disks, optical disks, or any other non-volatile storage devices suitable for storing large quantities of data. The storage devices in storage subsystem 74A can be organized as a Redundant Array of Inexpensive Disks (RAID), in which case the file server 2 accesses the storage subsystem 4 using one or more well-known RAID protocols.

Storage server 72A communicates through a cluster interconnect with its failover partner, storage server 72B. Storage server 72B is coupled locally to its own storage subsystem 74B, which includes multiple mass storage devices. Storage servers 72A and 72B may be file servers, for example.

Also connected to cluster interconnect is a large-capacity NAM module 71. The NAM module 71 may be the same as or similar to the large-capacity NAM module 21 of FIG. 2A or FIG. 2B. NAM module 71 includes a backup power source such as a battery backup (not shown) to enable the NAM module 71 to function as a transaction memory. A single, centralized NVLog 76, which can be accessed by either storage server 72A or storage server 72B, is stored in the large-capacity NAM module 71, rather than storing a separate copy of NVLog in each cluster partner.

During normal operation of this system, storage server 72A may receive a write request from a client 71. In response, storage server 72A: 1) sends the write request (a transaction) to the NAM module 71, for addition to the NVLog 76; 2) waits for an acknowledgement from the NAM module 71; and 3) sends an acknowledgment to the client 71 as soon as it receives the document from the NAM module 71.

The storage server 72A does not need to wait for any acknowledgement from its cluster partner 72B before acknowledging the write to the client 71. Further, by using this configuration, a storage server can have two or more cluster partners ("N+1 clustering") without the need to have a priori knowledge of their identities. Any authorized storage server connected to the NAM module 71 can obtain access to the NVLog 76.

The controllers 11 within the NAM module 71 can implement an access control (authentication and/or authorization) protocol, to ensure that only authorized storage servers (or other devices) can access the NVLog 76 and/or other data that may be stored in the NAM module 71. In such embodiments, the communication protocol described above can be easily extended to add appropriate simple commands for access control, such as an Authenticate command, a Set Policy command, etc. Further, the controllers 11 within the NAM module 71 can be configured to maintain different permissions and access rights for different users. For example, a particular user may have read-only access to some data stored in the NAM module 71 and read/write access to other data stored in the NAM module 71. Or, a particular user may have read-only access to all data stored in the NAM module 71 while another user has read/write access to all data stored in the NAM module 71. It should be recognized that access control implemented by a NAM module can also be used in other embodiments described herein.

A transaction NAM can also be used to facilitate the acquisition of snapshots in a storage system. As noted above, one example of a network storage system includes multiple file servers, each of which implements a portion of a file system. The system may be as shown in FIG. 7, where each of the storage servers 72A and 72B is a file server. When a snapshot of the entire file system is requested, each of the file servers takes a snapshot of its portion of the file system. However, the snapshot request may be received at slightly different times at each of the file servers 72, due to differing and unpredictable communication distances and delays between the file servers 72. Yet it is critical that each file server 72 take its snapshot at the same instant in time, to maintain data consistency.

This problem can be solved, in part, by using a large-capacity NAM module such as described above to store a single, centralized NVLog for multiple file servers, as shown in FIG. 7. Further, any snapshot request is forwarded to the NAM module 71. The snapshot is acquired at only one centralized location, the NAM module 71, not at each individual file server 72. If any of the file servers 72 attempts to modify the data while the snapshot is still pending (e.g., in response to a client request), the NAM module 71 either disallows the attempt, or it allows it but sends a message back to that storage server 72 indicating that the modification occurred while a snapshot was pending. Therefore, no data inconsistency results.

Note that the techniques discussed with reference to FIG. 7 are not limited to use in cluster-failover configurations or for storing an NVLog of read/write transactions. That is, these techniques can be easily extended and/or modified to allow centralized access to any type of transaction server by multiple devices.

Thus, a NAM and applications for such a memory have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A variable-performance network storage system comprising:
   a storage pool which includes
      a first plurality of storage devices of a first media type characterized by RAM-based network-accessible memory (NAM) elements, wherein each of the RAM-based NAM elements comprises;
         a substrate for a memory element;
         memory coupled to the substrate;
         network interface circuitry mounted to the substrate, the network interface circuitry comprising a plurality of network physical layer circuits, each to connect the memory to a network, wherein the network physical layer circuits implement a low level block protocol; and
         logic circuitry for a memory controller, mounted to the substrate and coupled between the network interface circuitry and the memory, to control access to the memory by a storage host through the network interface circuitry, wherein the storage host is external to the NAM element, the logic circuitry comprising a plurality of media access controllers coupled to the plurality of network physical layer circuits, and
      a second plurality of storage devices of a second media type different from the first media type; and
   the storage host to control access to the storage pool on behalf of a client, the storage host writing data selectively to storage devices of the storage pool by applying a storage prioritization scheme, including applying a different storage priority to storage devices of the first plurality of storage devices than to storage devices of the second plurality of storage devices, and wherein the storage host is configured to automatically and selectively migrate data stored in one or more of the second plurality of storage devices to the plurality of storage devices based on a predetermined age criterion.

2. A variable-performance network storage system as recited in claim 1, wherein the memory comprises a plurality of memory modules mounted to the substrate.

3. A variable-performance network storage system as recited in claim 2, wherein the plurality of memory modules are serially connected to each other and to the logic circuitry.

4. A variable-performance network storage system as recited in claim 1, wherein:
   the first plurality of storage devices have different cost and performance characteristics from the second plurality of storage devices; and
   the storage host applies the prioritization scheme based on the relative performance characteristics of the first and second pluralities of storage device.

5. A variable-performance network storage system as recited in claim 1, wherein the network interface circuitry implements an Ethernet physical layer.

6. A variable-performance network storage system as recited in claim 1, wherein the data includes metadata.

7. A variable-performance network storage system as recited in claim 1, wherein the memory comprises a random access memory (RAM).

8. A variable-performance network storage system as recited in claim 1, wherein the logic circuitry comprises a field-programmable gate array.

9. A variable-performance network storage system as recited in claim 1, wherein the logic circuitry comprises an application-specific integrated circuit.

10. A variable-performance network storage system as recited in claim 1, further comprising a backup power source to provide power to the memory such that the memory is effectively non-volatile.

11. A variable-performance network storage system as recited in claim 1, wherein the memory comprises a plurality of random access memory (RAM) modules, wherein
   the network interface circuitry implements an Ethernet physical layer, and wherein the logic circuitry comprises a field-programmable gate array or an application-specific integrated circuit.

12. A machine-implemented method comprising:
   storing data on a first plurality of storage devices of a first media type characterized by RAM-based network-accessible memory (NAM) elements, wherein each of the RAM-based NAM elements comprises:
      a substrate for a memory element;
      memory coupled to the substrate;
      network interface circuitry mounted to the substrate, the network interface circuitry comprising a plurality of network physical layer circuits; and
      logic circuitry for a memory controller, mounted to the substrate and coupled between the network interface circuitry and the memory, wherein the logic circuitry comprises a plurality of media access controllers coupled to the plurality of network physical layer circuits;
   implementing, by the network physical layer circuits, a low level block protocol;
   connecting, by the network interface circuitry, the memory to a network;
   controlling, by the logic circuitry, storage host access to the memory, wherein the storage host is external to the NAM element, and wherein the storage host accesses the memory through the network interface circuitry;
   storing data on a second plurality of storage devices of a second media type different from the first media type, wherein the first and second plurality of storage devices are storage devices in a storage pool;
   controlling access to the storage pool, by the storage host, on behalf of a client, the storage host writing data selectively to storage devices of the storage pool by applying a storage prioritization scheme, including applying a different storage priority to storage devices of the first plurality of storage devices than to storage devices of the second plurality of storage devices; and
   migrating automatically and selectively, by the storage host, data stored in one or more of the second plurality of storage devices to the first plurality of storage devices based on a predetermined age criterion.

13. A machine-implemented method as recited in claim 12, wherein the memory comprises a plurality of memory modules mounted to the substrate.

14. A machine-implemented method as recited in claim 13, wherein the plurality of memory modules are serially connected to each other and to the logic circuitry.

15. A machine-implemented method as recited in claim 12, wherein:
   the first plurality of storage devices have different cost and performance characteristics from the second plurality of storage devices; and
   applying, by the storage host, the prioritization scheme based on the relative performance characteristics of the first and second pluralities of storage devices.

16. A machine-implemented method as recited in claim 12, wherein the network interface circuitry implements an Ethernet physical layer.

17. A machine-implemented method as recited in claim 12, wherein the data includes metadata.

18. A machine-implemented method a recited in claim 12, wherein the memory comprises a random access memory (RAM).

19. A machine-implemented method as recited in claim 12, wherein the logic circuitry comprises a field-programmable gate array.

20. A machine-implemented method as recited in claim 12, wherein the logic circuitry comprises an application-specific integrated circuit.

21. A machine-implemented method as recited in claim 12, wherein the memory is powered such that the memory is effectively non-volatile.

22. A machine-implemented method as recited in claim 12, wherein the memory comprises a plurality of random access memory (RAM) modules, and
   implementing, by the network interface circuitry, an Ethernet physical layer, and wherein the logic circuitry comprises a field-programmable gate array or an application-specific integrated circuit.

23. A non-transitory machine-readable medium having sequences of instructions stored therein which, when executed by a processor of a processing system cause the processor to perform a process comprising:
   storing data on a first plurality of storage devices of a first media type characterized by RAM-based network-accessible memory (NAM) elements, wherein each of the RAM-based NAM elements comprises:
      a substrate for a memory element;
      memory coupled to the substrate;
      network interface circuitry mounted to the substrate, the network interface circuitry comprising a plurality of network physical layer circuits; and
      logic circuitry for a memory controller, mounted to the substrate and coupled between the network interface circuitry and the memory, wherein the logic circuitry comprises a plurality of media access controllers coupled to the plurality of network physical layer circuits;
   implementing, by the network physical layer circuits, a low level block protocol;
   connecting, by the network interface circuitry, the memory to a network;
   controlling, by the logic circuitry, storage host access to the memory, wherein the storage host is external to the NAM element, and wherein the storage host accesses the memory through the network interface circuitry;
   storing data on a second plurality of storage devices of a second media type different from the first media type, wherein the first and second plurality of storage devices are storage devices in a storage pool;
   controlling access to the storage pool, by the storage host, on behalf of a client, the storage host writing data selectively to storage devices of the storage pool by applying a storage prioritization scheme, including applying a different storage priority to storage devices of the first plurality of storage devices than to storage devices of the second plurality of storage devices; and
   migrating automatically and selectively, by the storage host, data stored in one or more of the second plurality of storage devices to the first plurality of storage devices based on a predetermined age criterion.

24. A non-transitory machine-readable medium as recited in claim 23 wherein the memory comprises a plurality of memory modules mounted to the substrate.

25. A non-transitory machine-readable medium as recited in claim 24, wherein the plurality of memory modules are serially connected to each other and to the logic circuitry.

26. A non-transitory machine-readable medium as recited in claim 23, wherein:
   the first plurality of storage devices have different cost and performance characteristics from the second plurality of storage devices; and
   applying, by the storage host, the prioritization scheme based on the relative performance characteristics of the first and second pluralities of storage devices.

27. A non-transitory machine-readable medium as recited in claim 23, wherein the network interface circuitry implements in Ethernet physical layer.

28. A non-transitory machine-readable medium as recited in claim 23, wherein the data includes metadata.

29. A non-transitory machine-readable medium as recited in claim 23, wherein the memory comprises a random access memory (RAM).

30. A non-transitory machine-readable medium as recited in claim 23, wherein the logic circuitry comprises a field-programmable gate array.

31. A non-transitory machine-readable medium as recited in claim 23, wherein the logic circuitry comprises an application-specific integrated circuit.

32. A non-transitory machine-readable medium as recited in claim 23, wherein the memory is powered such that the memory is effectively non-volatile.

33. A non-transitory machine-readable medium as recited in claim 23, wherein the memory comprises a plurality of random access memory (RAM) modules, and
   implementing, by the network interface circuitry, an Ethernet physical layer, and wherein the logic circuitry comprises a field-programmable gate array or an application-specific integrated circuit.

* * * * *